United States Patent
Chen

(10) Patent No.: US 10,311,911 B2
(45) Date of Patent: Jun. 4, 2019

(54) METHOD AND APPARATUS FOR COMPREHENSIVE VEHICLE SYSTEM STATE CAPTURE

(71) Applicant: FORD GLOBAL TECHNOLOGIES, LLC, Dearborn, MI (US)

(72) Inventor: Yifan Chen, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/665,548

(22) Filed: Aug. 1, 2017

(65) Prior Publication Data

US 2019/0043532 A1 Feb. 7, 2019

(51) Int. Cl.

| B60L 3/12 | (2006.01) |
|---|---|
| G06F 3/14 | (2006.01) |
| G06F 17/40 | (2006.01) |
| G11B 20/10 | (2006.01) |
| G11B 27/34 | (2006.01) |
| G06F 16/438 | (2019.01) |

(Continued)

(52) U.S. Cl.
CPC .......... *G11B 20/10527* (2013.01); *B60L 3/12* (2013.01); *G06F 3/0482* (2013.01); *G06F 3/04842* (2013.01); *G06F 3/1454* (2013.01); *G06F 17/40* (2013.01); *G11B 27/34* (2013.01); *G06F 16/438* (2019.01); *G11B 2020/10537* (2013.01)

(58) Field of Classification Search
CPC .. B60L 3/12; B60L 2240/00; B60R 2300/207; B60R 2300/50; B60R 2300/80; G06C 5/008; G06C 5/08; G06F 3/14; G06F 3/1454; G06F 3/16; G06F 17/30717; G06F 17/3074; G06F 17/3005; G06F 17/30749; G06F 17/40

See application file for complete search history.

(56) References Cited

U.S. PATENT DOCUMENTS

| 8,421,864 B2 * | 4/2013 | Tano ..................... G07C 5/0858 348/148 |
|---|---|---|
| 8,571,863 B1 | 10/2013 | Harb et al. |

(Continued)

FOREIGN PATENT DOCUMENTS

| EP | 0629978 A1 * | 12/1994 | ........... G07C 5/0858 |
|---|---|---|---|
| WO | WO-9213738 A1 * | 8/1992 | ............. B60K 28/02 |
| WO | 2016077262 A1 | 5/2016 | |

*Primary Examiner* — Jesse A Elbin
(74) *Attorney, Agent, or Firm* — Frank Lollo; Brooks Kushman P.C.

(57) ABSTRACT

A system includes a processor configured to receive a capture instruction from a vehicle user. The processor is also configured to capture a plurality of center-stack display-related states responsive to the capture instruction. The processor is further configured to capture a predetermined amount of audio from a currently playing media source responsive to the capture instruction. The processor is additionally configured to store the captured center-stack related states and predetermined amount of audio in a record file and, responsive to selection of the record file, recreate a center stack display and audio output by respective reference to the display-related states and predetermined amount of audio stored in the record file.

18 Claims, 3 Drawing Sheets

(51) Int. Cl.
*G06F 3/0482* (2013.01)
*G06F 3/0484* (2013.01)

(56) References Cited

U.S. PATENT DOCUMENTS

| | | | |
|---|---|---|---|
| 8,954,229 B2* | 2/2015 | Park | G07C 5/00 |
| | | | 701/1 |
| 2014/0075356 A1* | 3/2014 | Gray | G07C 5/008 |
| | | | 715/771 |
| 2014/0277844 A1* | 9/2014 | Luke | G07C 5/008 |
| | | | 701/2 |
| 2016/0019892 A1 | 1/2016 | Klimecki | |

* cited by examiner

METHOD AND APPARATUS FOR COMPREHENSIVE VEHICLE SYSTEM STATE CAPTURE

TECHNICAL FIELD

The illustrative embodiments generally relate to methods and apparatuses for comprehensive vehicle system state capture.

BACKGROUND

In a world of digital media and information, people are constantly being presented with a variety of digital opportunities. Songs played on a radio can be tagged and instantly ordered, advertisements leave people one click away from a desired product, and the constant presence of connected devices provides ongoing chances to share, capture and interact with their environment in a digital fashion.

For example, vehicle computing systems may provide an option to "tag" a song when the song is played on a radio. This may save the name of the song playing, and a user can later retrieve the tag and purchase the song. Or, for example, an alert may be presented to a user whenever a tagged song is being played on another radio station.

SUMMARY

In a first illustrative embodiment, a system includes a processor configured to receive a capture instruction from a vehicle user. The processor is also configured to capture a plurality of center-stack display-related states responsive to the capture instruction. The processor is further configured to capture a predetermined amount of audio from a currently playing media source responsive to the capture instruction. The processor is additionally configured to store the captured center-stack related states and predetermined amount of audio in a record file and, responsive to selection of the record file, recreate a center stack display and audio output by respective reference to the display-related states and predetermined amount of audio stored in the record file.

In a second illustrative embodiment, a system includes a processor configured to receive a request to access a vehicle-state record file. The processor is also configured to obtain audio, visual and meta-data associated with the record file, captured by a vehicle when the file was created. The processor is further configured to use the audio data to recreate an audio output duplicative of audio playing when the file was created and use the visual and meta-data to recreate a center stack display duplicative of a center stack display-state when the file was created.

In a third illustrative embodiment, a computer-implemented method includes capturing a predetermined amount of audio data from a current audio source, currently displayed visual data on a center stack display, and meta-data supporting touch-selectable elements on the center stack display, responsive to a user capture request and storing the captured audio, visual and meta data in a capture record file.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
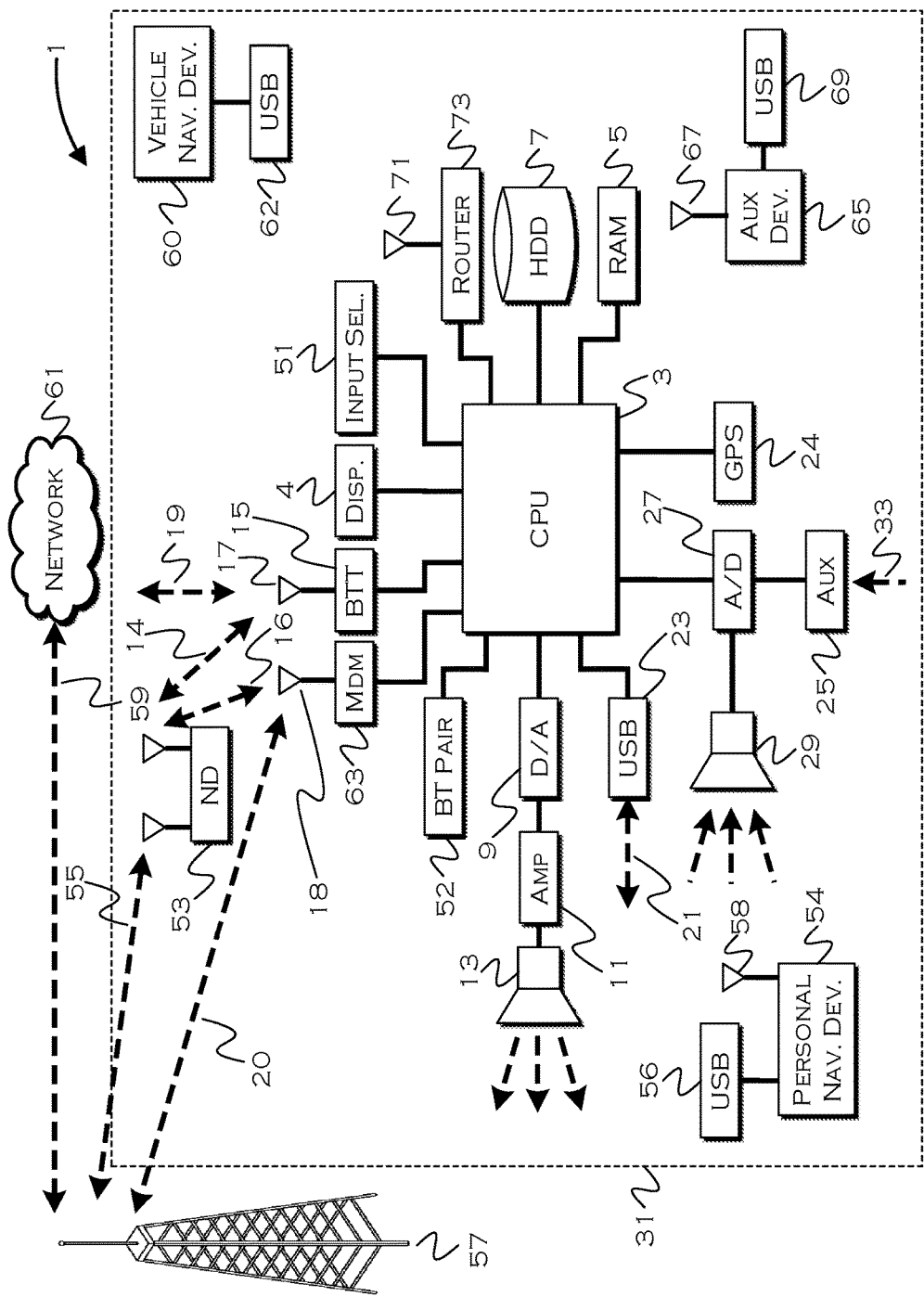
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments propose a vehicle-state capture technique referred to herein as life-capture. Instead of simply tagging a song or piece of media, the embodiments propose a selectable option to capture a large array of vehicle state data. With regards to capturing media data, this can include, for example, stack data, a media audio clip of current media data, a screen capture of a touch display, which can include the meta data allowing for interaction with the display, application state data, etc. Other data could also be captured, which can include, for example, location data, instrument panel data and even vehicle system state data.

By selecting an instance of the captured data, the user can recreate a moment during which the data was captured. The vehicle computer can load the screen state data, play any recorded audio clip, and even spoof the instrument panel data (if digital and permissible) to recreate the dataset captured during the recording phase. Interactive functions (advertisements, for example) can be re-presented and the process can generally obtain far more information than a simple tag of a song. And, for songs that are not digitally identified, the music clip itself can be used to search for an instance of the song.

This provides a variety of functionality not obtainable through song tagging, which can include, for example:

"Snapshotting a radio promotion"—(e.g., call 222-222-2222 at 1:00 PM for tickets to a concert)—recovery of the moment would allow for playback of the time and call numbers, which is an event that common song tagging could not record;

"Retrieval of a digital coupon"—as digital coupons become more prevalent, a user could capture and retrieve a coupon for use later in the drive or in a later drive, for example, especially if the utilization was based on a code, although even select-to-utilize coupons could be saved and retrieved based on storing of metadata; or "Capturing a song played as part of a different media clip"—an announcement from a radio, or even a movie playing on a vehicle screen, could include a song which could be snapshotted and retrieved using a lookup application. Such media instances do not typically also include metadata indicating the song, so it may be the case that the song is only identifiable through media capture, for example.

These are just a few instances of expanded capabilities provided by the vehicle state snapshotting or life-capture function.

Figure 2:
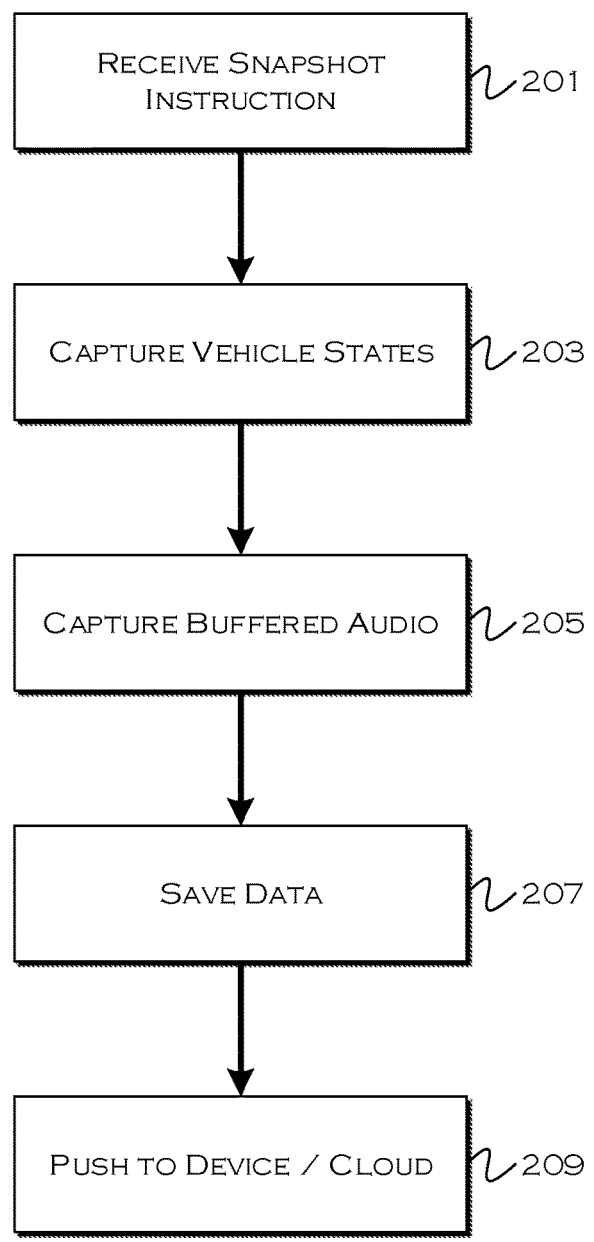
FIG. 2 shows an illustrative process for life-capture.

FIG. 2 shows an illustrative process for life-capture. In this example, the vehicle provides a button or digital control usable to instruct a life-capture. An occupant interacts with the button, and the vehicle process receives 201 the instruction to take a state-snapshot. The user may have preconfigured the state-snapshot to only record certain vehicle aspects, or a manufacturer may otherwise limit which states can be captured and recreated. On the other hand, it may be possible to capture a copy of virtually any digitally represent able vehicle state, and even the physical states of certain systems if desired (e.g., without limitation, HVAC settings, window states, seat positions, etc.). While many instances may not require full capture of so many vehicle states or full recreation of so many vehicle states, the nature of the digital data is such that these states could be captured and recreated if desired. In some instances (such as with vehicle speed), if a speed state was captured it may be only a digital recreation of the speeds obtained while the capture was ongoing, as opposed to actually accelerating a vehicle to those speeds to replicate the state data.

In this instance, and for illustration only, the disclosure will focus on the capture and recreation of media-related data, however the capture and recreation of additional vehicle state data, as noted above, is also contemplated and within the scope of the invention.

In response to the capture request, the process captures 203 vehicle media-related states, which include, but are not limited to, buffered audio 205 for a predetermined time period before and after the request, visual screen data, meta-data supporting any interactable screen features, etc. The process then saves 207 this data in a record file.

At a later point, or whenever a connected device usable for storage and/or transfer of the record file is connected to the vehicle computer, the process can upload 209 the record file(s) that were previously saved to the device and/or the cloud. These files can then be used by the user to recover and/or view the data in a manner that can replicate the cabin experience, to some extent, if desired.

Figure 3:
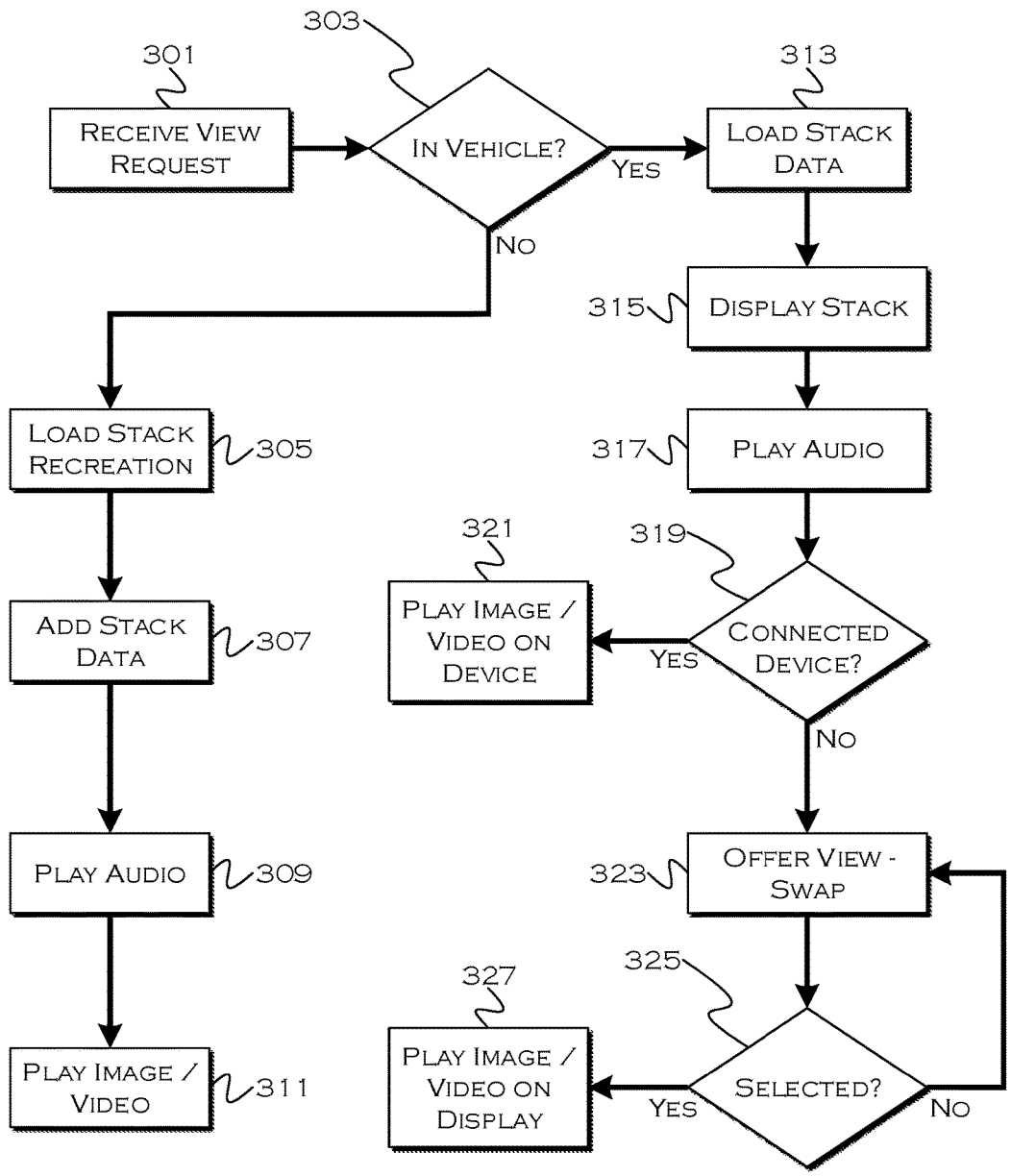
FIG. 3 shows an illustrative process for life-capture retrieval.

FIG. 3 shows an illustrative process for life-capture retrieval. If a record file is stored on a connected device, for example, there may be several options for retrieving and viewing the record file. One option would be to place the vehicle in a re-creation mode, whereby the saved state data is used to replicate the experience at time of capture by actually altering vehicle display states and/or system states. Another example would be to allow the user to view a cabin recreation on the device, and the cabin (or center stack) recreation could be digitally altered to reflect the states captured by the record file.

In a third example, the record files could be stored remotely and be retrievable by a user in a wireless manner. Typically, a manufacturer might require a user to have a vehicle in park and/or have an engine powered down before recreating a cabin-state, to minimize the chance that the recreation interferes with a driver or drive-critical vehicle system. Once the user has stopped and parked the vehicle, however, and/or powered down an engine, the user could recover a particular file from the cloud and have the vehicle recreate the experience based on the data included in the record file.

In the example shown in FIG. 3, the process receives 301 a request to view a saved record file. This request could come via vehicle computing system relating to a filed saved on a connected device, local storage or a cloud server, or could come via a non-vehicular computing system such as a mobile phone or a home PC.

The process first determines 303 if a user is presently in a vehicle. In this example, for illustration only, the saved state data relates to the center stack, so if the user is not actually in a vehicle then the process loads 305 a recreation of the vehicle stack (e.g., a graphic representation of the stack and/or screen) on the requesting device. This allows a user to use a phone or PC to recreate the captured data, without having to physically sit in the vehicle to request the data. Since the stack is virtual, it can be provided with similar functionality to that of the actual stack based on virtual inclusion, and if the user is using a non-touch interface, for example, touch-selectable elements can be created as mouse-clickable elements, for example. This also allows the user to interact with the virtual stack as though the user were sitting in the vehicle, to some extent.

The process then adds 307 the captured stack data to the virtual stack, which causes the displayed virtual stack to take-on the captured state, reflecting any visual elements captured as well as interactable elements captured by reference to the captured meta-data providing interaction support for those elements. The process also plays 309 the captured audio data and any captured video or image data 311 that may change as the audio data changes. Essentially, the virtual stack recreates a fixed period of time surrounding (or preceding or following) the capture request.

Since it is not possible to know when a capture request will occur, the system can buffer a set of desirable state variables for a limited period of time, such that any capture request can look slightly backwards in time with regards to capturing the state variables and audio/video. If the time period is fairly limited, the process man not require significant amounts of memory to provide this buffering. In other instances, only certain aspects are buffered (e.g., video/audio) and the display and other vehicle state data may be recreated from the capture request onward.

If the user is physically present within the vehicle when the process receives the retrieval request, the process may use the vehicle computer to load 313 stack data associated with the record file. This could be done after any necessary or desired safety checks (e.g., is the vehicle stopped/parked/etc.) are undertaken by the process.

Using the recovered stack data, the process alters 315 a stack display or displays to reflect the state(s) captured by the life-capture request and stored in the record file. This could cause the stack to revert to a display replicating or closely replicating the state displayed when the life-capture request was implemented.

The process also uses the vehicle speakers to play 317 the audio recording and/or a video recording. In some instances, the user may have captured data, such as video data, from a vehicle video screen, which may be in the rear of the vehicle. In the playback instance, instead of simply playing the video on the rear-screen (which might be inconvenient for the user to view), the process checks 319 to see if there is a connected device present. If the connected device has a screen, the vehicle can use the connected device screen to play back the video 321.

While the vehicle may certainly use the rear screen for playback, another example of playback utility could be the offer 323 of a view swap to the user, whereby the user can swap the displayed center stack recreation for the video playback. If the user selects 325 this option, the process could play back 327 the video on the primary display.

Children are increasingly turning to digital content sources such as youtube for viewing content, and a parent could use the above feature to both monitor and recover content viewed by occupant-children. For example, if a parent heard potentially objectionable content playing, the parent could snapshot the state, which would include the rear-content display in some instances. This could allow the parent to review the content later, as well as serve as a deterrent from the children viewing objectionable content. To some extent, this prevents the parent from having to try to control or see what their child is viewing while the vehicle is traveling.

In a similar instance, an advertisement or product displayed in content could be snapshotted by the parent for gift-giving purposes. The parent could hear the child exclaim "oh, this is such a cool thing!" and then snapshot the video to later determine if the product should be purchased for the child. These are just a few examples of how this proposed functionality can improve a user experience far beyond the capability of tagging a song for later purchase or listening.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
    a processor configured to:
    receive a capture instruction from a vehicle user;
    capture a plurality of center-stack display-related states responsive to the capture instruction, wherein the center-stack display-related states include metadata supporting interactable portions of the center stack display;
    capture a predetermined amount of audio from a currently playing media source responsive to the capture instruction;
    store the captured center-stack display-related states and predetermined amount of audio in a record file; and
    responsive to selection of the record file, recreate a center stack display and audio output by respective reference to the center-stack display-related states and predetermined amount of audio stored in the record file.

2. The system of claim 1, wherein the center-stack display-related states include graphics displayed on the center stack.

3. The system of claim 1, wherein the predetermined amount of audio includes at least audio that played immediately prior to the capture instruction.

4. The system of claim 1, wherein the processor is configured to capture data from at least one non-center stack display in response to the capture instruction.

5. The system of claim 4, wherein the processor is configured to recreate the non-center stack display as part of recreating the center stack display and audio output.

6. The system of claim 5, wherein the processor is configured to offer to swap the center stack display between the recreated center stack display and the recreated non-center stack display.

7. A system comprising:
    a processor configured to:
    receive a vehicle-state file access request;
    obtain audio, visual, and metadata, associated with the file, captured by a vehicle upon file creation;
    use the audio data to recreate audio output duplicative of audio playing upon file creation; and
    use the visual and metadata to recreate a center stack display, including user-selectable elements supported by the metadata, duplicative of a center stack display-state upon file creation.

8. The system of claim 7, wherein the processor is configured to recreate the audio output over vehicle speakers.

9. The system of claim 7, wherein the processor is configured to recreate the center stack display on a vehicle center stack display.

10. The system of claim 7, wherein the processor is configured to recreate the audio output over non-vehicular-device speakers.

11. The system of claim 7, wherein the processor is configured to recreate the center stack display on a virtual center stack displayed on a non-vehicular-device display.

12. The system of claim 7, wherein the processor is configured to determine that multiple screens are represented by the visual data and to offer an option to switch between the multiple screens on a single center stack display.

13. The system of claim 7, wherein the processor is configured to determine that multiple screens are represented by the visual data and to recreate the multiple screens by displaying data captured corresponding to each screen on a respective screen from which the data was originally captured.

14. The system of claim 7, wherein the processor is configured to determine that multiple screens are represented by the visual data and to recreate the multiple screens by displaying data captured corresponding to a non-center stack display on a non-vehicular device in wireless communication with a vehicle computer including the processor.

15. A computer-implemented method comprising:
capturing a predetermined amount of audio data from a current audio source, currently displayed visual data on a center stack display, and metadata enabling recreation of touch-selectable elements on the center stack display, responsive to a user capture request; and
storing the captured audio, visual, and meta-data in a capture record file.

16. The method of claim 15, wherein the predetermined amount of audio data includes at least a buffered portion representing audio data playing prior to the capture request.

17. The method of claim 15, further comprising capturing additional displayed data and additional audio data from at least one non-center stack display responsive to the capture request, and including the additional displayed data and additional audio data in the capture record file.

18. The method of claim 15, further comprising:
using the stored audio, visual, and metadata to recreate a vehicle audio and center stack display state reflective of audio and center stack display states when the stored audio, visual, and metadata was captured.

\* \* \* \* \*